US007580394B2

(12) United States Patent
Garcia-Luna-Aceves

(10) Patent No.: US 7,580,394 B2
(45) Date of Patent: Aug. 25, 2009

(54) SYSTEM AND METHOD FOR COLLISION-FREE TRANSMISSION SCHEDULING IN A NETWORK

(75) Inventor: Jose J. Garcia-Luna-Aceves, San Mateo, CA (US)

(73) Assignee: Nokia Corporation, Espoo (FI)

( * ) Notice: Subject to any disclaimer, the term of this patent is extended or adjusted under 35 U.S.C. 154(b) by 1118 days.

(21) Appl. No.: 10/306,613

(22) Filed: Nov. 27, 2002

(65) Prior Publication Data
US 2004/0100929 A1    May 27, 2004

(51) Int. Cl.
*H04W 4/00* (2006.01)
(52) U.S. Cl. .................. 370/338; 370/348; 370/349; 370/458; 370/459; 370/462; 370/463; 370/254; 370/400; 370/329
(58) Field of Classification Search .................. 370/338, 370/348, 349, 458, 459, 462, 463, 254, 400, 370/329
See application file for complete search history.

(56) References Cited
U.S. PATENT DOCUMENTS

| 4,661,902 | A |   | 4/1987 | Hochsprung et al. ........ 364/200 |
| 4,789,983 | A | * | 12/1988 | Acampora et al. .......... 370/349 |
| 5,231,634 | A |   | 7/1993 | Giles et al. ................ 370/95.1 |
| 5,319,641 | A |   | 6/1994 | Fridrich et al. ............. 370/85.3 |
| 5,394,436 | A | * | 2/1995 | Meier et al. ................. 375/132 |
| 5,502,724 | A |   | 3/1996 | Chen et al. ................. 370/85.3 |
| 5,231,634 | A |   | 4/1996 | Giles et al. ................ 370/95.1 |
| 5,638,371 | A |   | 6/1997 | Raychaudhuri et al. ..... 370/347 |
| 5,673,031 | A | * | 9/1997 | Meier .......................... 340/2.4 |
| 5,682,382 | A | * | 10/1997 | Shepard ....................... 370/342 |
| 5,721,725 | A |   | 2/1998 | Want et al. .................. 370/236 |
| 5,748,619 | A | * | 5/1998 | Meier .......................... 370/278 |
| 5,970,062 | A | * | 10/1999 | Bauchot ................... 370/310.2 |
| 6,278,687 | B1 | * | 8/2001 | Hunneyball ................. 370/217 |
| 6,282,678 | B1 | * | 8/2001 | Snay et al. .................. 714/712 |
| 6,363,062 | B1 | * | 3/2002 | Aaronson et al. ........... 370/348 |
| 6,400,702 | B1 | * | 6/2002 | Meier .......................... 370/338 |
| 6,442,615 | B1 | * | 8/2002 | Nordenstam et al. ........ 709/241 |
| 6,490,258 | B1 | * | 12/2002 | Quinquis et al. ............. 370/331 |
| 6,535,488 | B1 | * | 3/2003 | Mahe .......................... 370/238 |

(Continued)

OTHER PUBLICATIONS

Bao, L. and Garcia-Luna-Aceves, J.J. "Channel Access Scheduling in Ad Hoc Networks with Unidirectional Links," Association for Computing Machinery. Proceedings of the Fifth International Workshop on Discrete Algorithms and Methods for Mobile Computing and Communications, Rome, Italy. Jul. 21, 2001, pp. 9-18.

(Continued)

*Primary Examiner*—Lester Kincaid
*Assistant Examiner*—Diego Herrera
(74) *Attorney, Agent, or Firm*—Squire, Sanders & Dempsey, LLP

(57) ABSTRACT

A system and method is directed to enabling a collision-free transmission of a packet in a network by employing an access-point tree optimized MAC (ATOM) mechanism. The system enables a node in an ad hoc network to determine a collision-free transmission schedule based in part on information the node has about a distance to an access point along a routing tree rooted at the access point. The node may be assigned a time slot for collision-free transmission based in part on a bandwidth demand at the node, and traffic the node has to forward on behalf of a neighbor node.

35 Claims, 4 Drawing Sheets

U.S. PATENT DOCUMENTS

| | | | |
|---|---|---|---|
| 6,553,355 B1 * | 4/2003 | Arnoux et al. | 706/13 |
| 6,574,669 B1 * | 6/2003 | Weaver | 709/239 |
| 6,788,702 B1 * | 9/2004 | Garcia-Luna-Aceves et al. | 370/458 |
| 6,801,502 B1 * | 10/2004 | Rexford et al. | 370/235 |
| 6,836,463 B2 * | 12/2004 | Garcia-Luna-Aceves et al. | 370/238 |
| 6,928,061 B1 * | 8/2005 | Garcia-Luna-Aceves et al. | 370/329 |
| 7,046,639 B2 * | 5/2006 | Garcia-Luna-Aceves et al. | 370/314 |
| 7,113,519 B2 * | 9/2006 | Hammel et al. | 370/458 |
| 7,159,035 B2 * | 1/2007 | Garcia-Luna-Aceves et al. | 709/241 |
| 7,184,413 B2 * | 2/2007 | Beyer et al. | 370/254 |
| 7,339,897 B2 * | 3/2008 | Larsson et al. | 370/252 |
| 7,339,947 B2 * | 3/2008 | Hammel et al. | 370/458 |
| 7,352,729 B2 * | 4/2008 | Fujiwara et al. | 370/338 |
| 7,356,043 B2 * | 4/2008 | Hammel et al. | 370/458 |
| 2002/0067736 A1 * | 6/2002 | Garcia-Luna-Aceves et al. | 370/442 |
| 2003/0165117 A1 * | 9/2003 | Garcia-Luna-Aceves et al. | 370/238 |

OTHER PUBLICATIONS

Bao, L. and Garcia-Luna-Aceves, J.J. "A New Approach to Channel Access Scheduling for Ad Hoc Networks," Mobile Computing and Networking 2001. Proceedings of the Seventh Annual International Conference on Mobile Computing and Networking, Rome, Italy. Jul. 16-21, pp. 120-220.

Bao, L. and Garcia-Luna-Aceves, J.J. "Collision-Free Topology Dependent Channel Access Scheduling," Milcom 2000. 21st Century Military Communication Conference Proceedings, Los Angeles, California. Oct. 22-25, 2000, pp. 507-511.

Chen, K.C. "Medium Access Control of Wireless LANs for Mobile Computing," IEEE Network, 1994, vol. 8, No. 5, pp. 50-63.

Chlamtac, I. "Fair Algorithms for Maximal Link Activation in Multihop Radio Networks," IEEE Transactions on Communications, Jul. 1987, vol. COM-35, No. 7, pp. 739-746.

Chlamtac, I. et al. "Time-Spread Multiple-Access (TSMA) Protocols for Multihop Mobile Radio Networks," IEEE/ACM Transactions on Networking, Dec. 1997, vol. 5, No. 6, pp. 804-812.

Ephremides, A. and Truong, T. "Scheduling Broadcasts in Multihop Radio Networks," IEEE Transactions on Communications, Apr. 1990, vol. COM-38, No. 4, pp. 456-460.

Fullmer, C. L. and Garcia-Luna-Aceves, J.J. "Floor Acquisition Multiple Access (FAMA) for Packet-Radio Networks," Computer Communication Review. Proceedings of the ACM SIGCOMM 1995, Cambridge, MA. Aug. 28-Sep. 1, 1995, pp. 262-273.

Fullmer, C. L. and Garcia-Luna-Aceves, J.J. "Solutions to Hidden Terminal Problems in Wireless Networks," Computer Communication Review. Proceedings of the ACM SIGCOMM 1997, Cannes, Frane, Sep. 14-18, 1997, pp. 39-49.

Garcia-Luna-Aceves, J.J. and Tzamaloukas, A. "Reversing the Collision Avoidance Handshake in Wireless Networks," Milcom 1999. Proceedings of the Fifth Annual IEEE/ACM International Conference on Mobile Computers and Networking, Seattle, Washington. Aug. 15-20, 1999, pp. 120-131.

Ju, Ji-Her and Li, Victor O.K. "An Optimal Topology-Transparent Scheduling Method in Multihop Packet Radio Networks," IEEE. ACM Transaction on Networking, Jun. 1998, vol. 6, No. 3, pp. 297-306.

Karn, P. "MACA—a new channel access method for packet radio," ARRL/CRRL Amateur Radio. Proceedings of the 9th Computer Networking Conference, London, Ontario. Sep. 22, 1990, pp. 134-140.

Shepard, T. "A Channel Access Scheme for Large Dense Packet Radio Networks," Computer Communication Review, Oct. 1996, vol. 26, No. 4, pp. 219-230.

Tang, Z. and Garcia-Luna-Aceves, J.J. "Hop-Reservation Multiple Access (HRMA) for Multichannel Packet Radio Networks," Proceedings of the IEEE IC3N '98: Seventh International Conference on Computer Communications and Networks, Lafayette, Louisana. Oct. 12-15, 1998. Computer Communications, 2000, vol. 23, pp. 877-886.

Tang, Z. and Garcia-Luna-Aceves, J.J. "A Protocol for Topology-Dependent Transmission Scheduling in Wireless Networks," Proceedings of the IEEE Wireless Communications and Networking Conference, New Orleans, Louisiana. Sep. 21-24, 1999, pp. 1333-1337.

Tobagi, F. A. and Kleinrock, L. "Packet switching in radio channels: Part II- the hidden terminal problem in carrier sense multiple-access modes and the busy-tone solution," IEEE Transactions on Communications, Dec. 1975, vol. COM-23, No. 12, pp. 1417-1433.

Tobagi, F. A. and Kleinrock, L. "Packet switching in radio channels: Part III—polling and (dynamic) split—channel reservation multiple access," IEEE Transactions on Communications, Aug. 1976, vol. COM-24, No. 8, pp. 832-845.

Wu, C. and Li, V.O.K "Receiver-initiated busy-tone multiple access in packet radio networks," ACM SIGCOMM 1987 Workshop: Frontiers in Computer Communications Technology, Stowe, VT. Aug. 1987, pp. 336-342.

Young, C. D. "USAP: A Unifying Dynamic Distributed Multichannel TDMA Slot Assignment Protocol," MILCOM 1996 Conference Proceedings, Oct. 22, 1996, pp. 235-239.

Zhu, C. and Corson M.S., "A Five-Phase Reservation Protocol (FPRP) for Mobile Ad Hoc Networks," Proceedings of the IEEE INFOCOM 1998, Conference on Computers and Communications, San Francisco, California. Mar. 29-Apr. 2, 1997, vol. 1, pp. 322-331.

* cited by examiner

Variables:

Self: IR computing its ASL request
tasl: Number of time slots with anchor needed to support anchored IRs
casl: Aggregate number of time slots needed for ASLs with anchored IRs
sasl: Number of time slots needed to support traffic from self
lasl: Number of slots in largest anchored ASL from any anchored IR
asl_a(k): Number of time slots in anchored ASL with anchored IR k
asl_s(k): Number of time slots in self ASL with anchored IR k
CIR: Set of anchored IRs Procedure Local_ALF AIR <- list of all IRs anchored by self

CIR <- AIR lasl <- 0 casl <- 0

: Compute the anchored ASL with the largest number of time slots from any
: anchored IR while CIR not empty do begin k <- next IR in CIR CIR <- CIR – k if ( asl_a(k) > lasl )

then begin lasl <- asl_a(k)

ID <- k end end do

: Compute slots needed for ASLs with all anchored IRs for each k in AIR do casl <- casl + asl_a(k) + asl_s(k)

Diff <- [ asl_a(ID) + asl_s(ID) ] + lasl - casl if (Diff > 0)

*Fig. 4.*

SYSTEM AND METHOD FOR COLLISION-FREE TRANSMISSION SCHEDULING IN A NETWORK

FIELD OF THE INVENTION

The present invention relates to network routing, and more particularly to scheduling of transmissions without collisions in a wireless network.

BACKGROUND OF THE INVENTION

Many medium-access control (MAC) protocols have been developed for wireless networks. The carrier-sense multiple access (CSMA) protocol was the first to be used in multihop packet-radio networks. A limitation of CSMA in multihop networks is that sources hidden from one another cannot detect their transmissions, which degrades CSMA's performance to that of the pure ALOHA protocol. Many MAC protocols have been proposed and implemented to solve the hidden-terminal problems of CSMA. The throughput of CSMA protocols is very good, as long as the multiple transmitters within range of the same receivers can sense one another's transmissions. Unfortunately, "hidden terminal" problems degrade the performance of CSMA substantially, because carrier sensing cannot prevent collisions in that case.

The busy tone multiple access (BTMA) protocol (F. A. Tobagi and L. Kleinrock, "Packet switching in radio channels: Part II—the hidden terminal problem in carrier sense multiple-access modes and the busy-tone solution," IEEE Trans. Commun., vol. COM-23, no. 12, pp. 1417-1433, 1975.) was the first proposal to combat the hidden-terminal problems of CSMA. BTMA is designed for station-based networks and divides the channel into a message channel and the busy-tone channel. The base station transmits a busy-tone signal on the busy-tone channel as long as it senses carrier on the data channel. Because the base station is in line of sight of all terminals, each terminal can sense the busy-tone channel to determine the state of the data channel. The limitations of BTMA are the use of a separate channel to convey the state of the data channel, the need for the receiver to transmit the busy tone while detecting carrier in the data channel, and the difficulty of detecting the busy-tone signal in a narrow-band channel.

A receiver initiated busy-tone multiple access protocol for packet-radio networks has also been proposed (C. Wu and V. O. K. Li, "Receiver-initiated busy-tone multiple access in packet radio networks," ACM SIGCOMM 87 Workshop: Frontiers in Computer Communications Technology, Stowe, Vt., USA, 11-13 Aug. 1987). In this scheme, the sender transmits a request-to-send (RTS) to the receiver, before sending a data packet. When the receiver obtains a correct RTS, it transmits a busy tone in a separate channel to alert other sources that they should back off. The correct source is always notified that it can proceed with transmission of the data packet. The limitations of this scheme are that it still requires a separate busy-tone channel and full-duplex operation at the receiver.

Several protocols have been proposed based on different types of "collision-avoidance" handshakes done with small control packets and meant to avoid data collisions when sources of data packets cannot hear one another. The collision-avoidance approach in the prior art follows the basic philosophy first introduced by Tobagi and Kleinrock in the Split-Channel Reservation Multiple Access (SRMA) protocol (F. A. Tobagi and L. Kleinrock, "Packet switching in radio channels: Part III—polling and (dynamic) split-channel reservation multiple access," IEEE Trans. Commun., vol. COM-24, no. 8, pp. 832-845, 1976). In SRMA, and most subsequent collision-avoidance protocols, a sender node sends a request-to-send (RTS) packet to the intended receiver, either sensing the channel before sending the RTS or not sensing the channel before the RTS transmission. A receiver that hears a clean RTS responds with a clear-to-send (CTS), and the sender can send a data packet after hearing a clean CTS.

U.S. Pat. No. 5,319,641 assigned to Echelon Systems Corp. discloses a method to improve CSMA p-persistent protocols by introducing a random waiting time that stations must wait listening to the channel once they have packets to send. The method disclosed does not work in networks with hidden terminals.

U.S. Pat. No. 4,661,902 assigned to Apple Computer, Inc. discloses a method that amounts to an implementation of SRMA over a single channel in which stations use carrier sensing before sending RTSs.

MACA (P. Karn, "MACA—a new channel access method for packet radio," in ARRL/CRRL Amateur Radio 9th Computer Networking Conference, pp. 134-40, ARRL, 1990) consists of a technique that amounts to SRMA running over a single channel in which a request-to-send (RTS) packet is sent without carrier sensing. There appears to be no description of how to support packet trains.

U.S. Pat. No. 5,231,634 assigned to Proxim, Inc. discloses a method that also applies SRMA's basic approach over a single channel. The RTS specifies the length of the impending data packet.

U.S. Pat. No. 5,502,724 assigned to International Business Machines Corporation discloses a method that extends the collision avoidance handshake to allow for multiple data packets to flow among a pair of communicating stations. A station that intends to establish a connection with a second station senses the channel. If the channel is idle, it sends a connection request (CR) packet to the intended receiver station. The CR specifies the number of data packets that the connection includes. The intended receiver sends a connection confirm (CC) packet to the sending station; the CC also specifies the number of packet in the connection. After the exchange of correct CR and CC packets, the sending station may send one or multiple data packets and the receiving station may send an acknowledgment packet specifying which data packets were received correctly. To end the connection, the sending station sends a disconnect request (DR) and the receiving station issues a disconnect confirm (DC). Stations that receive a CR packet back off for an amount of time that is long enough for the advertised number of data packets to be sent to the receiver. After receiving a CR or CC, a station can attempt to access the channel when a timer proportional to the number of packets to be sent in the connection expire, or when it receives a DR or DC packet. The limitation with the method disclosed in U.S. Pat. No. 5,502,724 is that the method cannot ensure collision-fee transmissions of data packets, even with the transmission of CC packets by the receiver. The need for feedback from the receiver to its neighbors on a packet-by-packet basis was demonstrated by Fullmer and Garcia-Luna-Aceves (C. L. Fullmer and J. J. Garcia-Luna-Aceves, "Solutions to Hidden Terminal Problems in Wireless Networks", Proc. ACM SIGCOMM 97, Cannes, France, Sep. 14-18, 1997). Because the CC packet sent by the receiver may collide with another packet at a neighbor of a receiver, the CC packet does not provide sufficient feedback to hidden nodes; furthermore, the need for feedback packets to be longer than request packets was also demonstrated by Fullmer and Garcia-Luna-Aceves (C. L. Fullmer and J. J. Garcia-Luna-Aceves, "Floor Acquisition Multiple Access (FAMA) for Packet-Radio Networks," Proc. ACM SIGCOMM 95, Cambridge, Mass., Aug. 28-Sep. 1, 1995). In addition, even though the disclosed method makes reference to broadcast packets sent to all the neighbors of a station, it provides no provisions to ensure that broadcast or multicast packets are received without interference by all the neighbors of a sending station.

U.S. Pat. No. 5,721,725 assigned to Xerox Corp. discloses a method similar to SRMA, and describes it to be an improvement over MACA. The method disclosed extends MACA by specifying in the RTS packets the desired data rate for data packets and allowing sender and receiver to negotiate the transmission data rate. This method fails to guarantee collision free transmissions in networks with hidden terminals because no provisions are made on the length of the CTS being longer than the length of any RTS to ensure that collisions of RTSs and CTSs are detected by hidden stations.

DFWMAC IEEE802.11 (K. C. Chen, "Medium Access Control of Wireless LANs for Mobile Computing," IEEE Network, vol. 8, no. 5, pp. 50-63, 1994), FAMA-NCS (C. L. Fullmer and J. J. Garcia-Luna-Aceves, "Solutions to Hidden Terminal Problems in Wireless Networks", Proc. ACM SIGCOMM 97, Cannes, France, Sep. 14-18, 1997), and RIMA (J. J. Garcia-Luna-Aceves and A. Tzamaloukas, "Reversing the Collision Avoidance Handshake in Wireless networks," Proc. ACM/IEEE Mobicom 99, August 1999) are three recent additional examples of collision-avoidance protocols. IEEE 802.11 is a method very similar to SRMA with carrier sensing for the transmission of RTSs. The objective of FAMA-NCS is for a station that has data to send to acquire control of the channel in the vicinity of the receiver (which we call "the floor") before sending any data packet, and to ensure that no data packet collides with any other packet at the receiver. FAMA-NCS makes the length of CTSs much longer than the length of RTSs in order to detect the collision of RTSs with CTSs, which cannot be enforced in prior collision-avoidance protocols. RIMA consists of a family of protocols that reverse the collision-avoidance handshake method first introduced in SRMA and makes the receiver polls the sender of data.

Several other medium access control (MAC) protocols have been proposed for either single-channel wireless networks or wireline local area networks that are based on similar RTS-CTS exchanges, or based on RTSs followed by pauses. However, despite the popularity gained by collision-avoidance protocols and systems based on such protocols over the past few years, two key performance limitations of all collision-avoidance MAC protocols are that: (a) they cannot provide channel-access delay guarantees, which represents a big problem for real-time applications; and (b) they lack explicit support of collision-free multicasting or broadcasting, which implies that either a node must transmit the same multicast packet multiple times, once to each multicast-group neighbor, or packets are sent with likelihood of reception as low as the ALOHA protocol. In addition, collision-avoidance protocols require carrier sensing, which is not technically or economically feasible to implement correctly in direct sequence spread spectrum radios with very high chip rates.

To circumvent hidden-terminal interference problems, unique codes (spreading codes or frequency-hopping sequences) can be assigned to receivers or senders. An example of this approach is the Metricom network. However, receiver oriented code assignment (ROCA) and transmitter oriented code assignment (TOCA) require either pre-configuring radios with the node to code mappings, or finding the codes being used by neighboring transmitters or receivers. Furthermore, efficient broadcasting is not guaranteed simply by establishing a TOCA approach, because all the neighbors of a transmitter must agree to listen to the transmitter at the same time to minimize the number of transmissions.

Another approach to channel access used in multihop wireless networks consists of establishing transmission schedules, i.e., allocating stations to different times and data channels (e.g., frequencies, spreading codes, or their combination) in a way that no collisions occur. Transmission scheduling can be static or dynamic; MAC protocols based on dynamic transmission scheduling explore the spatial reuse of the radio channel and thus have much higher channel utilization than such fixed scheduling approaches as TDMA and FDMA.

In TDMA protocols, time is divided into frames consisting of time slots. Time slots are allocated to specific nodes or a centralized station is used to allocate the time slots. The limitations of TDMA stem from the fixed assignment of time slots to nodes, which is slow to adapt to network changes and makes inefficient use of the channel if nodes are bursty sources of traffic, and the use of centralized assignments.

There are many approaches in the prior art based on dynamic TDMA methods in which stations use ALOHA, slotted ALOHA or other contention protocols in an uplink to request time slots from a base station. An example of this approach is the system disclosed in U.S. Pat. No. 5,638,371 assigned to NEC USA, Inc. The present invention eliminates the need for a base station to make slot assignments.

A number of protocols have been proposed in the recent past to provide dynamic time-slot allocation without requiring central base stations. These protocols can be classified as topology-independent and topology-dependent time scheduling protocols.

Shepard (T. Shepard, "A Channel Access Scheme for Large Dense Packet Radio Networks," Proc. SIGCOMM '96, 1996; T. Shepard, "Scalable, Self-Configuring Packet Radio Network Having Decentralized Channel Management Providing Collision-Free Packet Transfer," U.S. Pat. No. 5,682,382, Oct. 28, 1997), Chlamtac et al (I. Chlamtac et al, "Time-Spread Multiple-Access (TSMA) Protocols for Multihop Mobile Radio Networks," IEEE/ACM Transactions on Networking, 'Vol. 5, no. 6, December 1997), and Ju and Li (Ji-Her Ju, Victor O. K. Li, "An Optimal Topology-Transparent Scheduling Method in Multihop Packet Radio Networks," IEEE/ACM Transactions on Networking, Vol. 6, no. 3, June 1998) have proposed topology-independent time-scheduling protocols. In these protocols, nodes are pre-assigned (by means of their nodal IDs, for example) or adopt a transmission schedule that they publish, and such a schedule specifies the times when a node transmits and receives. The protocols guarantee or provide a high likelihood that at least one transmission time in a node's schedule does not conflict with any node one or two hops away. In the Chlamtac and Ju approaches, nodes are unable to determine which transmissions will succeed, complicating the job of higher layer (e.g., link-layer) protocols. These approaches also require values for the total number of nodes in the network and maximum number of neighbors for each node, as input parameters to the algorithm, thus making them design for the worst case conditions (and thus, inefficient if the network is not as dense as expected), or being sensitive to actual network conditions (if the network is larger or more dense than expected). Shepard's approach avoids collisions by assuming nodes are synchronized with their neighbors, have knowledge of their neighbors' schedules, and are able to receive from multiple transmitting neighbors simultaneously. This final assumption requires fairly sophisticated radio hardware.

Zhu and Corson (C. Zhu, M. S. Corson, "A Five-Phase Reservation Protocol (FPRP) for Mobile Ad Hoc Networks," Proc. IEEE INFOCOM '98) and Tang and Garcia-Luna- Aceves (Z. Tang and J. J. Garcia-Luna-Aceves, "A Protocol for Topology-Dependent Transmission Scheduling," Proc. IEEE Wireless Communications and Networking Conference 1999 (WCNC 99), New Orleans, La., Sep. 21-24, 1999; Z. Tang and J. J. Garcia-Luna-Aceves, "Hop-Reservation Multiple Access (HRMA) for Multichannel Packet Radio Networks", Proc. IEEE IC3N '98: Seventh International Conference on Computer Communications and Networks, Lafayette, La., Oct. 12-15, 1998) have developed topology-dependent scheduling protocols, such that a node acquires a transmission schedule that allows the node to transmit without interfering with nodes one and two hops away from itself, and such that channel reuse is increased as the number of neighbors per node decreases. These protocols require nodes to contend in order to reserve collision-free time slots, and the contention is done on each mini-slot. Furthermore, they rely on dividing each slot into several mini-slots. All this limits the minimum duration that slots may have. The present invention does not require slots to be subdivided, and does not require nodes to reply to neighbors in less than a frame time.

Several approaches have been proposed that are based on TDMA and require an initial, topology-independent schedule, followed by communication among the network nodes to negotiate a final schedule. Chlamtac (I. Chlamtac, "Fair Algorithms for Maximal Link Activation in Multihop Radio Networks," IEEE Transactions on Communications, Vol. COM-35, no. 7, July, 1987) proposed an algorithm based on a repeating link schedule that can adapt to traffic demands after some number of iterations of the algorithm. The algorithm starts with a "single-slot-per-link" schedule, such as provided by assigning each node a transmission slot according to its node ID. At each iteration, schedule information and a scheduling "token" are routed up and down a routing tree (established by means of pre-existing algorithms), to assign additional slots to nodes or links according to their degree of unmet traffic demands. Ephremides and Truong (A. Ephremides, T. Truong, "Scheduling Broadcasts in Multihop Radio Networks," IEEE Transactions on Communications, Vol. COM-38, No. 4, April, 1990) proposed a similar algorithm in which each node is initially assigned a slot corresponding to its node ID, and then each node uses their assignment to pass "skeleton" schedules to their neighbors. During the next two frames (two iterations of communicating schedules), and in accordance with fixed node priorities, nodes are able to grab available slots until all available slots are taken (i.e., no more slots can be assigned without causing collisions). Because of the need for schedules that are fixed, requiring a few iterations to converge, and of scheduling-frame size equal to the maximum size of the network, these approaches have limited scalability and robustness to mobility or other dynamics. The approach proposed by Young (C. D. Young, "USAP: A Unifying Dynamic Distributed Multichannel TDMA Slot Assignment Protocol," Proc. IEEE MILCOM 96 OCTOBER 1996) also requires initial assignment of one slot per node, and then negotiation of scheduling packets for assignment of the other slots. However, the initially assigned slot is limited to the first slot in each "frame." Thus, each node's assigned slot occurs every N frames, where N is the maximum network size. Because of this, the approach does not scale. Also, the approach is relatively slow in adapting to dynamic traffic conditions, because a node needs to wait up to N frames before a proposed schedule addition is confirmed by a neighbor.

The majority of the limitations described above for the MAC protocols in the prior art are eliminated with the Robust Environmentally Adaptive Link/MAC (REALM) protocol (D. Beyer, J. J. Garcia-Luna-Aceves, and C. Fullmer, "Adaptive Communication Protocol for Wireless Networks," U.S. patent application Ser. No. 09/248,738, 10 Feb. 1999, in combination with the Neighborhood Established Transmission Scheduling (NETS) protocol (J. J. Garcia-Luna-Aceves, D. Beyer and C. Fullmer, "A Protocol for Neighborhood Established Transmission Scheduling," application Ser. No. 09/418,899, 15 Oct. 1999).

REALM is a MAC protocol that achieves collision avoidance without the need for handshakes between senders and receivers. REALM assumes a synchronous network organized into time frames divided into slots. The amount of synchronization assumed in REALM is the same type of synchronization required in any network operating with frequency hopping radios, such as those designed to operate in ISM bands and commercially available today. A node running REALM must know the identities of its one-hop and two-hop neighbors and the present time in the network (e.g., the number of the current frame). Based on this information, and auxiliary information, each node evaluates a function (e.g., a hash function) that specifies deterministically which node should transmit in which time slot of a frame. REALM achieves fairness by changing in each frame the priority with which a given node can transmit in a time slot of the frame. Once all the nodes in the two-hop neighborhood of a node have consistent information regarding their neighborhood, collisions are avoided because all the nodes use the same deterministic algorithm to select a winner for a given time slot.

Bao and Garcia-Luna-Aceves (L. Bao and J. J. Garcia-Luna-Aceves, "A New Approach to Channel Access Scheduling for Ad Hoc Networks," Proc. ACM MobiCom 2001—Seventh Annual International Conference on Mobile Computing and networking, Jul. 16-21, 2001, Rome, Italy; L. Bao and J. J. Garcia-Luna-Aceves, "Channel Access Scheduling in Ad Hoc Networks with Unidirectional Links," Proc. ACM DialM 2001—Fifth International Workshop on Discrete Algorithms and Methods for Mobile Computing and Communications, Jul. 21, 2001 Rome, Italy; L. Bao and J. J. Garcia-Luna-Aceves, "A New Collision-Free Medium Access Control Protocol" Proc. IEEE MILCOM 2000, Los Angeles, Calif., Oct. 22-25, 2000.) have proposed channel access algorithms that achieve collision avoidance without the need for a specific handshake between sender and receiver in a way similar to REALM. These algorithms require each node to have the identifiers of all the nodes within two hops, and assign a transmission priority to a node during a given time slot based on this neighbor information. An unspecified algorithm is assumed to disseminate neighbor information.

A limitation of using REALM by itself, or the algorithms proposed by Bao and Garcia-Luna-Aceves, to transmit data packets into the channel is that these approaches make no bandwidth reservations to support traffic flows. Hence, the number of times a node is allowed to transmit in a fixed number of frames has no correlation with the number of data packets that need to flow through that node, which means that packets at the node can experience variable delays being queued at the node waiting to reach the channel.

To solve the above limitations, NETS is used in combination with REALM, or a similar collision-avoidance method, to send schedule packets during a control section of a frame. NETS consists of a distributed transmission scheduling protocol for ad-hoc networks that builds and maintains collision-free transfers of unicast, multicast and broadcast packets. NETS then uses a control method (e.g., REALM) to determine when the nodes of the computer network send their NETS schedule packets containing neighborhood information. All transmission schedules are built on demand in NETS. The basic approach adopted in NETS is that of an election of the best schedule reported by nodes within two hops of one another. NETS introduces a set of rules, called an etiquette, that allows all nodes to decide which the winning schedule is once all the nodes maintain consistent information about who their one- and two-hop neighbors are.

A limitation of NETS is that the bandwidth reservations made among nodes are established asynchronously and without the sources and destinations of the flows being able to control the bandwidth reservations over the links along the paths between them. This can lead to congestion at the destinations of traffic and those nodes required to forward traffic for many other nodes.

Therefore, there is a need in the industry for a mechanism for scheduling of transmissions without collisions in a network in which a router may move.

SUMMARY OF THE INVENTION

This summary of the invention section is intended to introduce the reader to aspects of the invention. Particular aspects of the invention are pointed out in other sections herein below, and the invention is set forth in the appended claims, which alone demarcate its scope.

The present invention is directed to a method for scheduling communication of a data packet in a network. The method includes sending a scheduling request over an access point tree to an access point. The scheduling request includes an aggregate of time slot requests associated with at least a node and a next hop node. The method also includes receiving a scheduling decision over the access point tree at the node and the next hop node. Each time slot request in the scheduling decision is reserved for at least the next hop node and the node. The scheduling decision also enables the node to communicate the data packet collision-free over orthogonal data channels associated with the next hop node and the node.

In another aspect of the present invention, a node is directed to scheduling communication of a data packet in a network. The node includes a transceiver and a transcoder. The transceiver is configured to send a scheduling request over an access point tree to an access point and receive a scheduling decision over the access point tree from the access point. The transcoder is configured to enable the scheduling request to comprise an aggregate of time slot requests associated with at least the node and a next hop node. The transcoder is also configured to employ the scheduling decision to determine each time slot request that is reserved for at least the next hop node and the node, wherein the scheduling decision enables the node to communicate the data packet collision-free over orthogonal data channels associated with the next hop node and the node.

In still another aspect of the present invention, a system is directed to scheduling communication of a data packet in a network. The system includes a node and an access point. The node that is configured to send a scheduling request over an access point tree to an access point. The scheduling request includes an aggregate of time slot requests associated with at least the node and a next hop node. The access point is configured to determine a scheduling decision over the access point tree in response to the aggregated request. The access point is further configured to transmit the scheduling decision over the access point tree to the node and the next hop node, wherein each time slot request in the scheduling decision is reserved for at least the next hop node and the node. The scheduling decision enables the node to communicate the data packet collision-free over orthogonal data channels associated with the next hop node and the node.

In yet another aspect of the present invention, a computer-readable medium encoded with a message packet is directed to a control packet means for communicating transmission-scheduling information between nodes in a network.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 4 illustrates pseudo-code showing one embodiment for a process of determining a number of time slots for a node with its anchor, in accordance with the present invention.

DETAILED DESCRIPTION OF THE PREFERRED EMBODIMENT

In the following detailed description of exemplary embodiments of the invention, reference is made to the accompanied drawings, which form a part hereof, and which is shown by way of illustration, specific exemplary embodiments of which the invention may be practiced. Each embodiment is described in sufficient detail to enable those skilled in the art to practice the invention, and it is to be understood that other embodiments may be utilized, and other changes may be made, without departing from the spirit or scope of the present invention. The following detailed description is, therefore, not to be taken in a limiting sense, and the scope of the present invention is defined only by the appended claims.

Throughout the specification and claims, the following terms take the meanings explicitly associated herein, unless the context clearly dictates otherwise.

The term "router" refers to a dedicated network element that receives packets and forwards them towards a destination. In particular, a router is used to extend or segment networks by forwarding packets from one subnet to another. A router typically operates at layer 3 TCP/IP of the Open Systems Interconnection (OSI) reference model for networking. However, some routers can provide additional functionality that operates above layer 3 of TCP/IP or OSI reference model.

The term "access router" refers to a router that is associated with a node for providing IP connectivity between the node and other nodes on a network, such as a correspondent node. Although the access router is a dedicated network element coupled to an IP network, it may also be in communication with one or more points of attachment for a wireless network. Moreover, an access router, may comprise an access point.

The meaning of "a," "an," and "the" include plural references. The meaning of "in" includes "in" and "on." Additionally, a reference to the singular includes a reference to the plural unless otherwise stated or is inconsistent with the disclosure herein.

Briefly stated, the present invention is directed to a system and method for scheduling of a collision-free transmission of a packet in a network, such as an ad hoc network. Each node within the network is assigned a time slot for collision-free transmission based on the bandwidth demand at each node, as well as the traffic that each node needs to forward on behalf of some of its neighbor nodes, to and from destinations reached through an Internet access point. A collision-avoidance handshake is not required for each data packet transmission. Moreover, no pre-assignments of transmission times (slots), channels, or codes are required.

Illustrative Environment

A system and method for the scheduling of transmissions in a network, such as an ad hoc network, will now be described. In the following description, numerous specific details are set forth in order to provide a thorough understanding of the present invention.

Figure 1:
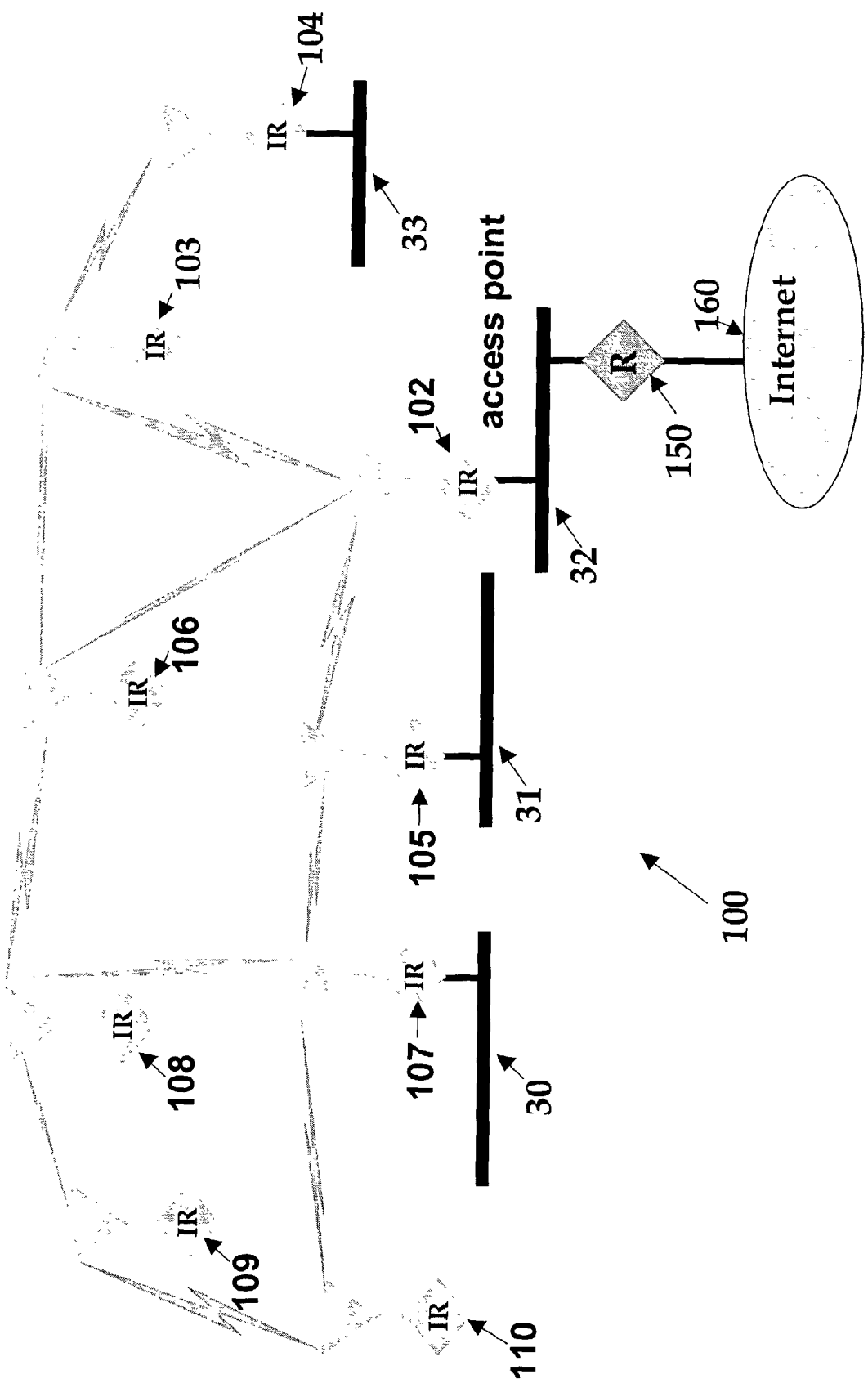
FIG. 1 illustrates a functional block diagram generally showing an overview of one embodiment of an ad-hoc network employing a single access point.

FIG. 1 illustrates a functional block diagram generally showing an overview of one embodiment of an ad-hoc network employing a single access point. System 100 may include many more components than those shown in FIG. 1. The components shown, however, are sufficient to disclose an illustrative embodiment for practicing the invention.

The nodes executing the method described in the present invention are called Internet Radios (IR). In the description of the invention, "node" and "Internet Radio" are used interchangeably.

As shown in the figure, system 100 includes nodes 102-110, local Area Networks (LANs) 30-33, router 150, and Internet 900. In one embodiment of the invention, router 150 performs as an access point to an ad-hoc network comprising nodes 102-110.

Node 102 is in communication with nodes 105, 106, and 103. Node 104 is in communication with node 103. Node 106 is also in communication with 103 and 108. Node 105 is also in communication with node 107. Node 107 is in further communication with nodes 110 and 108. Node 108 is in further communication with node 109. Node 110 is in communication with 109.

LAN 30 is in communication with node 107; LAN is in communication with node 105; LAN 32 is in communication with node 102; and LAN 33 is in communication with node 104. Router 150 is in communication with node 150 and Internet 160.

Generally, nodes 102-110 may include any device capable of connecting to a wireless network. Such devices include cellular telephones, smart phones, pagers, radio frequency (RF) devices, infrared (IR) devices, integrated devices combining one or more of the preceding devices, and the like. Nodes 102-110 may also include other devices that have a wireless interface, such as Personal Digital Assistants (PDAs), handheld computers, personal computers, multiprocessor systems, microprocessor-based or programmable consumer electronics, network PCs, wearable computers, and the like.

LANs 30-33 can employ any form of computer readable media for communicating information from one electronic device to another. LANs 30-33 can include direct connections, such as through a universal serial bus (USB) port, other forms of computer-readable media, or any combination thereof. Links within LANs typically include fiber, twisted wire pair or coaxial cable, while links between networks may utilize analog telephone lines, full or fractional dedicated digital lines including T1, T2, T3, and T4, Integrated Services Digital Networks (ISDNs), Digital Subscriber Lines (DSLs), wireless links including satellite links, fiber, Asymmetric Digital Subscriber Lines (ADSL), Video Digital Subscriber Lines (VDSL), or other link known to those skilled in the art. Furthermore, remote computers and other related electronic devices can be remotely connected to either LANs or Wide Area Networks (WANs) via a modem and temporary telephone link.

The media used to transmit information in the links illustrates one type of computer-readable media, namely communication media. Generally, computer-readable media includes any media that can be accessed by a computing device. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, communication media includes wired media such as twisted pair, coaxial cable, fiber optics, wave guides, and other wired media and wireless media such as acoustic, RF, infrared, and other wireless media.

Router 150 is typically point of attachment devices on a communications network providing IP (packet-based) connectivity between node 102 and other nodes on a network. On a single network linking many computers through an ad-hoc network of possible connections, router 150 receives transmitted messages and forwards them to their correct destinations over available routes. On an interconnected set of LANs, including those of differing architectures and protocols, router 150 may act as a bridge or link within LANs, enabling messages to be sent from one to another.

The present invention employs an access-point tree optimized MAC (ATOM) protocol. This protocol enables the nodes of the ad hoc network to compute collision-free transmission schedules based on the information the nodes have about their distances to an access point along a routing tree rooted at the access point.

Time is divided into frames consisting of a known number of time slots, and frames can be further organized into epochs, with each epoch consisting of a fixed number of frames. Transmissions over specific time slots are controlled employing two separate mechanisms. One scheduling mechanism is called access-point scheduling and includes establishing transmission schedules based on routing information over a spanning tree rooted at an access point. Each node is provided with sufficient time slots to satisfy bandwidth demands resulting from traffic to and from destinations that may be reached through an Internet access point, and for which the node is the origin, sink, or relay of the traffic. ATOM schedule packets are used to establish and maintain access-point schedules. The other scheduling mechanism is called neighborhood channel-access mechanism and can be either a contention-based channel access protocol or a separate schedule-based channel access protocol.

In one embodiment of the present invention, the control method employed to determine when ATOM schedule packets are transmitted is REALM. Other mechanisms however, may be employed to instruct nodes when to transmit their ATOM control packets. An ATOM control packet specifies information needed for nodes to allocate bandwidth to nodes along a spanning tree rooted at the access point. This tree is called the access point tree.

In another embodiment of the present invention, nodes may learn about the existence of access points and their next hop to each such access point by a routing protocol employed in the network. In yet another embodiment of the present invention, ATOM packets carry enough information to learn about the existence of access points in the system.

Figure 2:
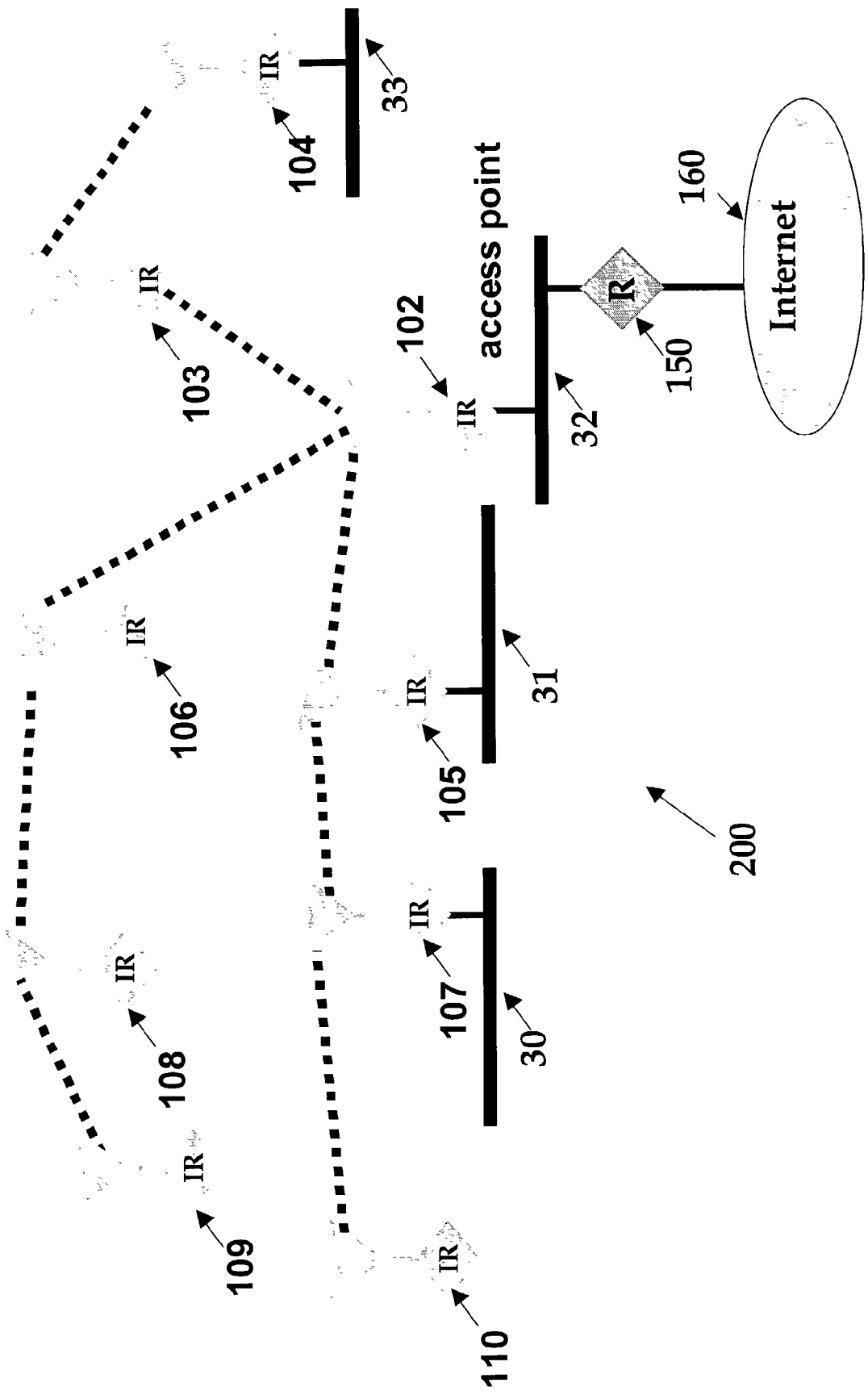
FIG. 2 illustrates a functional block diagram of one embodiment of an access-point tree for the ad-hoc network shown in FIG. 1.

The access point tree of an access point is defined by the choice at each node of the neighbor node currently used as next hop to the access point, which is called the anchor of the node. The access point tree can be established in different ways. In one embodiment of the present invention, the access point tree is established and maintained by the network-level routing protocol running in the network. FIG. 2 illustrates the access point tree for the network of FIG. 1.

When a node becomes operational, it employs the neighborhood channel-access scheme to start transmitting its data packets. Access-point scheduling is controlled by the access point, which establishes the network time when nodes can assume a new access-point transmission schedule. ATOM packets are employed to send a schedule request towards an access point over the access point tree, and the schedule assignments are sent back to the nodes over the access point tree according to the scheduling decisions made by the access point. Scheduling requests may be aggregated on their way to an access point; hence, the request from a node may take into account a demand from the node itself and from those neighbors for which the node is the next hop towards the access point. Aggregated requests are such that, within the number of time slots reserved by the anchor of a node, the node is able to communicate with its anchor data packets from its own flows and flows from those nodes for which it is the anchor, as well as communicate data packets with the neighbor nodes for which it is the anchor.

Figure 3:
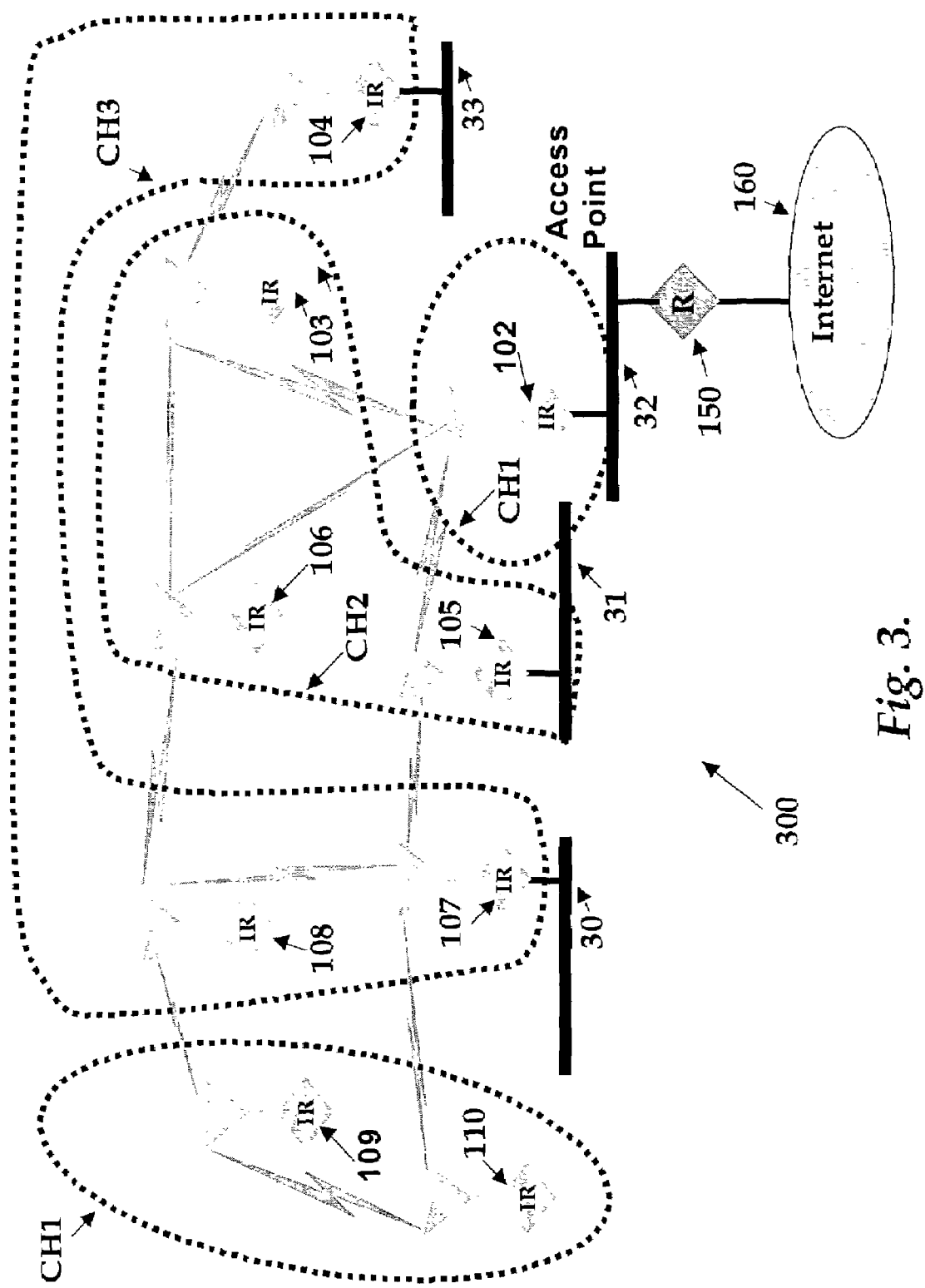
FIG. 3 illustrates a functional block diagram of one embodiment of channel assignments for the ad-hoc network shown in FIG. 1.

The reservations established for access-point scheduling may be made over three orthogonal channels associated with a given access point on a static or quasistatic basis. For access-point scheduling, each node in the network is allocated to a channel based on its minimum-hop distance to an access point, modulo three. FIG. 3 illustrates the modulo-three channel assignment for the network of FIG. 1 based on the access point tree shown in FIG. 2.

I. Basic Service and Assumptions

We assume that the radios used in the network are half-duplex and can tune to only one channel at a time, although they can switch to any of the available channels. Like previous MAC protocols based on transmission scheduling, the present invention assumes that time is slotted and that slots are grouped into frames. Frames are further organized into epochs. Note, however, that even protocols based on collision avoidance (e.g., IEEE 802.11) may require that time be slotted and organized into frames, depending on the radios used in the network. Such is the case for frequency hopping radios, because all radios must agree on the start times of frequency hops and the length of the hopping sequence.

We also assume that multiple orthogonal data channels may be available for data transmission; these channels can be implemented by means of multiple frequency bands, direct-sequence or frequency-hopped spreading codes, or combinations of waveforms that combine such techniques. The present invention focuses on the allocation of time slots for broadcast transmissions over a common channel, so that nodes can transmit control packets used for establishing transmission schedules over multiple data channels, or data packets.

The present invention also assumes bi-directional physical links among neighboring nodes; this is also true of collision-avoidance MAC protocols and is not a major limitation for the type of ad-hoc networks and radios for which the present invention is intended.

In one embodiment of the present invention, time slots are identified using a unique identifier specifying the position of the time slot in a frame and the position of a frame in an epoch. An epoch can be identified using the current time agreed upon among nodes by means of a time synchronization algorithm. In the description of the present invention, we simply use the term slot ID to denote the identifier of a time slot based on the "network age" of the network. Each epoch has a fixed number of frames and each frame has a fixed number of time slots.

To describe ATOM, access point scheduled link (ASL) is used to denote a reserved sequence of contiguous time slots with a specific start slot and an associated data channel. A data channel can be a spreading code, a frequency hop sequence, a frequency band, a data rate, and combinations of these and other transmission parameters.

Slots are allocated to ASLs on multiples of link units, where a link unit is the minimum number of contiguous slots that a non-empty ASL can require. Hence, the slot range of an ASL is a multiple of link units. Furthermore, the start slot of an ASL must be a number that is a multiple of link units. This is done to avoid orphan slots that cannot be allocated to any ASL.

In an embodiment of this invention, each neighbor of a node is identified by the node using a transmitter-assigned local link identifier, which we denote by XLID. In another embodiment of this invention, nodes can be identified by their MAC addresses. In the description of the present invention presented herein, we simply use the term node identifier to denote either XLIDs or MAC addresses of nodes. ATOM works correctly with both types of node identifiers. Each node can have up to a maximum of active one-hop neighbors. Each active one-hop neighbor is assigned a node identifier; and it is assumed that a node assigns consecutive node identifiers to active neighbors. The assignment of a node identifier to a neighbor is accomplished by means of a method that is outside the scope of the present invention.

In one embodiment of the present invention, REALM is used to determine when ATOM schedule packets are sent by each node, depending on its two-hop neighborhood. According to REALM, time is divided into frames of a known number of slots, and each frame is assigned a number that is known throughout the network. The first few slots of each frame are dedicated to the transmission of ATOM schedule packets; such slots are called control slots. Nodes use a common channel during such control slots, because ATOM schedule packets must be transmitted in broadcast mode so that all the neighbors of a node can receive the ATOM schedule packet sent by the node. The rest of the frame is used for the transmission of data; the slots in the remaining of the frame are called data slots.

Establishing access-point schedules in ATOM is based on a few basic principles. First, senders and receivers must find one another easily. To accomplish this when multiple channels are used, a node in ATOM must exchange ATOM control packets in the control slots of each frame. Next, data from a source must flow without interference from other sources over a reserved ASL, until conflicts due to mobility, errors due to the physical link, or the end of the flow are detected. Additionally, IRs must have the same degree of satisfaction of their traffic demands for traffic to and from destinations that must be reached through an access point. Moreover, ASLs are allocated over the common channels statically or quasi-statically associated with such an access point.

II. Information Exchanged and Maintained

The IRs in the network must be synchronized and must agree on the periods within which packets (e.g., control packets) will be scheduled. We call these periods "frames." Each Frame must be associated with a "Network Age," (NetAge) which changes from frame to frame, and is known throughout the network. For example, the network may be synchronized by epochs, frames, and slots, with a constant integer number (S) of slots per frame, and a constant integer number (F) of frames per epoch. Within each epoch, frames are numbered consecutively from 1 to F (the "Frame Number"). Epochs are also numbered consecutively, eventually wrapping back to Epoch Number 1 after E epochs. The above Network Age can be either the Frame Number concatenated with the epoch number, or simply just the Frame Number if the number of frames in an epoch is sufficiently large.

The present invention can be brought to practice together with the methods described in co-pending application Ser. No. 09/248,738, entitled "Adaptive Communication Protocol for Wireless Networks," filed Feb. 10, 1999, and assigned to the assignee of the present invention, incorporated herein by reference, for the assignment of transmission slots dynamically. These methods constitute the REALM (Robust Environmentally Aware Link and MAC) protocol.

Using REALM or an underlying mechanism at the physical layer, IRs determine the present network time, which identifies the present time slot in the current frame of the current epoch.

Separate control packets are used for access-point scheduling and neighborhood channel access. Furthermore, control packets for access-point scheduling must be transmitted with higher priority than control packets for neighborhood channel access.

In one embodiment of the present invention, an ATOM control packet for access-point scheduling specifies, in addition to such fields as protocol type and version number:

a) The ID of the sending IR.
b) The packet type, which is set to access-point scheduling.
c) The ID of the access point chosen by the IR for access-point scheduling.
c) The access point hop range, which is the maximum number of hops away from the access point over which access-point scheduling applies.
d) The number of hops from the IR to the access point.
e) A sequence number, which is specified by the sending IR.
f) The network time when the schedule starts taking effect and specified by the access point.
g) The ID of the selected anchor, which is the neighbor IR currently used as next hop to the access point.
h) The ID of the requested anchor, which is an IR being asked to replace the current anchor of the IR.
i) An ASL to the anchor used to support the IR's own flows, specified by the start slot and slot range of the ASL.
k) An ASL from the anchor used to support the IR's own flows, specified by the start slot and slot range of the ASL.
l) An ASL to the anchor used to support flows of IRs for which the IR is the anchor, specified by the start slot and slot range of the ASL.
m) An ASL from the anchor used to support flows of IRs for which the IR is the anchor, specified by the start slot and slot range of the ASL.
n) A list of one or more outgoing ASLs that the IR has established with its children in the access point tree (APT); each such ASL is specified by the identifier of the child IR, the start slot and the slot range occupied by the ASL.
o) A list of one or more incoming ASLs that the IR has established with its children in the APT; each such ASL is specified by the identifier of the child IR, the start slot and the slot range occupied by the ASL.
p) An aggregated request for ASLs specifying:
  1) The slot range for the ASL needed to the anchor for the IR's own flows,
  2) The slot range for the ASLs needed to the anchor for the IR to serve as anchor of other IRs,
  3) The slot range for the ASLs needed from the anchor for the IR's own flows, and
  4) The slot range for the ASLs needed from the anchor for the IR to serve as anchor of other IRs.

In another embodiment of the present invention, ASLs and requests for ASLs can be partitioned into priority classes. A priority class can be defined in terms of the type of flow for which bandwidth is being requested, the importance of the IR, or administrative policies. Priority classes can be as granular as a single IR, in which case an ASL and an ASL request needs to be communicated over the APT for each IR in the APT.

For simplicity, this description assumes that all ASLs have the same priority, and that established ASLs are specified in an order defined by their start slots, with the ASL with the smallest start slot number going first in the respective list.

Depending on the bandwidth available for the exchange of ATOM control packets, the dissemination of control information may be done incrementally or atomically. With incremental exchanges, multiple ATOM packets are used for a node to convey its schedule information. With atomic exchanges, all schedule information is contained in a single ATOM packet.

Each IR maintains the valid access-point scheduling information reported by its neighbors in a neighbor access-point scheduling table (NAST). In particular, the NAST of an IR specifies the APT to which each neighbor belongs, how far the neighbor IR is to the access point it chose, the ASLs to and from each neighbor, and the bandwidth available in the APT according to the neighbor.

III. Transmission Scheduling

When and why ASLs need to be established, and how many time slots are required in each ASL, are decisions made outside the scope of this invention.

The ATOM protocol operates based on requests for bandwidth made to IRs, which translates into ASLs.

Changes in radio connectivity may change the topology of the APT to which an IR belongs, which impacts its established and requested ASLs. The establishment and maintenance of ASLs is based on a distributed scheduling method that adheres to a novel etiquette of multi-channel reuse.

We refer to all the data that must be transmitted by a node to one or multiple neighbors over a given ASL as a flow. Data packets in the same flow, therefore, can be addressed to different network-level destinations sharing the same relay next node. The scheduling of such packets over an ASL is outside the scope of this invention. However, the ASL established in ATOM may last much longer than individual connections, because they service multiple connections.

Flows involving sources or destinations that must be reached through an access point are supported by ASLs established with access-point scheduling, while flows involving sources and destinations within the same ad hoc network are supported with the neighborhood channel access mechanism. Access-point scheduling controlled by a given access point takes place only within the access point hop range of the access point. This hop range can be modified for a number of reasons, such as reduce the interference among access-point schedules controlled by different access points.

For simplicity, it is assumed that ASLs involve only unicast transmissions from or toward an access point. The etiquette of channel reuse implemented in ATOM attempts to: (a) give access points control of the time slots allocated for ASLs, (b) provide quick resolution of conflicts among requested ASLs, (c) incur the least amount of disruption to existing ASLs, and (e) provide a fair assignment of ASLs. This etiquette is based on the following rules:

ATOM Rule 1: A node can request an ASL after listening in the control slots for a number of frames in order to learn the state of the two-hop neighborhood and hop distance information over the APT of the access point.

ATOM Rule 2: Any incoming or outgoing ASL that is being requested or is established has precedence over any transmission made based on the neighborhood channel access mechanism.

ATOM Rule 3: The slots of an ASL must be contiguous and the same data channel must be used for the entire ASL.

ATOM Rule 4: No ASL to or from a given node may overlap on any time slot with another ASL to or from the same node.

ATOM Rule 5: During any given time slot assigned for data transmission, a node that is not transmitting or receiving on an established ASL must be listening to the channel according to the neighborhood channel access mechanism.

ATOM Rule 6: A node can transmit only over established ASLs, or according to the neighborhood channel access mechanism.

Once a node has listened to the common control channel for a number of frames, it obtains the information it needs to decide which ASLs constitute the current schedule.

III.A. Access-Point Scheduling

Access Points and Transmission Channels:

Access-point scheduling is controlled by an access point. An access point determines the network time when nodes can assume a new routed transmission schedule, and such time is notified to all IRs in the network.

Access-point scheduling is used to send schedule requests towards an access point and send the assignments back to the nodes according to the scheduling decisions made by the access point. Routed schedule requests are aggregated on their way to an access point; that is, the request from a node takes into account the demands from the node itself and from those neighbors for which the node is the next hop towards the access point.

All the reservations established for access-point scheduling are made over three orthogonal channels associated with a given access point on a static or quasistatic basis. For access-point scheduling, each node in the network is allocated to a channel based on its minimum hop distance to an access point, modulo three. The access point itself is assigned one of those three orthogonal channels, called channel 1, and the access point assigns time slots over channel 1 to its various neighbors in order to satisfy traffic demands for flows traversing the access point and its immediate neighbors. All the neighbors of the access point are assigned to the same channel 2, which is orthogonal from channel 1, for the scheduling of time slots to their own neighbors, which are two hops away from the access point. Nodes that are two hops away from the access point are assigned to channel 3 and allocate time slots over this channel for traffic with those neighbors that are three hops away from the access point.

The allocation of three orthogonal channels to each access point is static and deterministic, based on the unique identifiers of the access points. A node simply orders the IDs of the access points known in the network and maps them in an ordered manner modulo 3 to the orthogonal channels available in the network.

Establishing and Maintaining Access Point Trees:

For a node to participate in access-point scheduling, it selects or is assigned an access point through which traffic for one or more of its flows. Once an access point has been selected for access-point scheduling, the IR must select an anchor for the chosen access point. Such an anchor is the neighbor IR that the IR chooses as its next hop along the min-hop path to an access point.

The choices of anchors made by nodes for a given access point define an access point tree (APT) for the access point, and access-point scheduling by a given access point takes place exclusively over its APT. When IR x is the anchor of IR y, IR y is said to be anchored by IR x.

A number of mechanisms can be used for an IR to select an access point. In one embodiment of the present invention, the network-level routing protocol is used to determine the anchor of an IR for a given access point. In another embodiment of the present invention, a distributed algorithm is used to select an anchor at each IR using information exchanged in ATOM packets. In the rest of this description, it is assumed that an IR obtains its anchor from the network-level routing protocol.

An IR can select an access point in many ways. The IR may always choose an access point from a set of access points to which it has the smallest hop-count distance. It may adopt the access point specified in the first control packet received by the IR. Alternatively, the IR may choose the access point to which it has an anchor with the smallest forwarding load over a path with the smallest hop-count distance to the access point. Once an IR has chosen an access point, it may stay with that access point for a predefined amount of time before attempting to improve its choice of access point.

Processing ATOM Packets:

The network time and sequence number fields of ATOM control packets are used to handle changes in the topology of the APT. The access point sends a control packet periodically with a network time and a sequence number. The network time specifies the time when a new allocation of bandwidth by the access point is to take effect, and that schedule remains valid for a large predefined number of epochs beyond the specified network time. The access point is the only one that can change the network time of the access-point schedule.

The sequence number field is used to validate ATOM packets that refer to the same allocation of bandwidth by the access point. Every time an IR sends an ATOM packet with the same network time, the IR increments the sequence number reported in the packet. An ATOM packet is determined to be current based on the network time and the sequence number it specifies. The network time of a valid ATOM packet must be the same or more recent than the network time specified previously by the same neighbor. An ATOM packet is valid if it has a valid network time and a sequence number that is higher than the last sequence number heard for the same valid network time.

When an IR receives an ATOM packet, it first determines if the packet carries new information with respect to the scheduling information reported previously by the same neighbor. If the scheduling information is outdated, the packet is discarded. If the packet carries current information, the IR stores the new information in its neighbor access-point scheduling table (NAST).

The access point may transmit ATOM packets with the same schedule in order to force local changes to access-point scheduling or refresh the connectivity status with its neighbor IRs.

When an IR receives an ATOM packet from any neighbor, it processes the ASLs specified in the packet as described in the subsequent section.

If an IR receives an ATOM packet from a neighbor other than its anchor, the IR may generate an ATOM packet in order to update the ASLs assigned over the APT, request APTs, or request a new anchor. In this case, the ATOM packet specifies the same network time adopted for the current access-point schedule, its min-hop distance to the access point, and an incremented sequence number to indicate to the neighbors of the IR that the ATOM packet contains new ASLs. If the IR receives an ATOM packet from its anchor specifying the same network time as the network time currently adopted for the access-point schedule by the IR, the IR may generate an ATOM packet if changes are needed to the ASLs used by the IR.

If an IR receives an ATOM packet from its anchor and the packet specifies a more recent network time than the one currently used for access-point scheduling, the IR generates an ATOM packet specifying the new network time, its min-hop distance to the access point, and a 0 sequence number. The ATOM packet also contains the ASLs (requested or established) known by the IR.

An IR may change its anchor for a variety of reasons. In such a case, it sends an ATOM packet towards its proposed new anchor. When an IR receives an ATOM packet with a valid network time and sequence number and specifying the IR as the requested anchor for the sending IR, it sends its own ATOM packet to its own anchor. This packet includes the aggregate requested bandwidth by the IR that requested the anchoring. The IR can become the anchor of another IR only after the IR receives an ATOM packet from its own anchor with the proper information. This packet specifies a valid network time and sequence number, and reports that the bandwidth requested by the neighbor IR has been granted by the anchor of the IR trying to become an anchor.

Allocating Bandwidth over the Access Point Tree:

For access-point scheduling, bandwidth is allocated exclusively over the APT. In this description, it is assumed that the ASL requests are symmetric, i.e., the ASL request to support the traffic between an IR and the access point is the same in both directions. However, asymmetric ASL requests can easily be supported. An IR needs an ASL to be established with its anchor before it can start sending data packets to its anchor as part of the access-point schedule.

A key objective of the bandwidth allocation approach of the present invention is to establish ASLs without conflict without an IR having to know more information than what its anchor reports in ATOM packets and the ASL requests from its anchored IRs.

We refer to the set of established ASLs for access point scheduling as the access point schedule (APS). The APS is established distributedly by IRs, but the allocation of time slots to IRs is ultimately controlled by the access point by the steps taken by anchors over the APT according to the algorithm described in this section.

Given that the access point controls the time when new schedules take effect throughout the wireless network, the bandwidth required between a given node and its anchor is always allocated over contiguous time slots to simplify ATOM packets. To avoid allocating an IR to more than one ASL at the same time, the ASLs between an IR and the IRs for which it is the anchor need not be allocated over contiguous time slots. Accordingly, a list of ASLs between an IR and the IRs for which it anchors is necessary in ATOM packets.

The amount of reserved bandwidth needed between the access point and its immediate neighbors equals the aggregate bandwidth necessary to support the traffic between each individual IR and the access point, plus additional bandwidth needed to avoid conflicts in the distributed assignment of ASLs.

Because the number of time slots associated with reserved bandwidth need not be the same as the number of time slots in a frame, the access-point load frame (ALF) is defined. ALF consists of the time slots required to support the aggregate traffic between the access point and its immediate neighbors without conflict over communication channel 1 allocated to the access point. The length of ALF is specified in ATOM packets in terms of the number of slots needed to support the conflict-free assignment of ASLs. The value of ALF helps IRs learn about the traffic load at the access point, and choose among the least loaded access points.

After a node selects an anchor, it can start sending ATOM packets with a request for an ASL to reserve bandwidth for traffic flowing between the IR and the access point, and any Internet destination reached through the access point. The IR keeps repeating its request to its anchor whenever it has the opportunity to transmit ATOM packets for access-point scheduling, until the IR receives an ATOM packet from its anchor with an ASL reflecting the request being granted by the access point. An IR requesting an ASL to support its own flows with the access point can change its request in subsequent ATOM packets. This may be due to changes in traffic demands at the host(s) attached to the IR.

Once an IR is selected by some of its neighbors as their anchor, it can start receiving ATOM packets from those neighbors with requests for ASLs. Upon receiving valid ATOM packets with such ASL requests, the IR aggregates the unsatisfied ASL requests from its neighbors and sends the aggregate request in its own ATOM packet to its anchor. The IR keeps transmitting the aggregated request in its ATOM packets, until the request is satisfied. The IR can change the aggregate request for ASLs as a result of changed in connectivity with neighbors and changes in traffic load.

A requested ASL may be satisfied in two ways. The new ASL granted to an IR may correspond to a new access-point schedule established by the access point, which necessarily takes effect at a network time that is a few frames or epochs into the future. Alternatively, the ASL may be granted within the current schedule, in which case the ASL is granted immediately. This latter case could occur only when some IR other than the access point can allocate spare bandwidth to the request, perhaps due to network connectivity changes or changes in traffic patterns.

To simplify the avoidance of hidden-terminal interference among IRs, ASLs are assigned over three orthogonal channels according to the hop distance of IRs to the access point in the APT. The access point assigns consecutive time slots in channel 1 to satisfy the aggregate request of each neighbor IR. In general, ASLs for traffic between an IR that is zero hops modulo-3 away from the access point and its neighbors in the APT are allocated over channel 1. ASLs for traffic between an IR that is one hops modulo-3 to the access point and its neighbors in the APT are allocated over channel 2. ASLs for traffic between an IR that is two hops modulo-3 to the access point and its neighbors in the APT are allocated over channel 3. However, the allocation of ASLs over the three channels associated with an APT must adhere to an additional flow-conservation rule to eliminate the case in which an IR is assigned an ASL over channel 1 during the same time slots when it is assigned other ASLs over channel 2 or 3.

The flow-conservation rule consists of ensuring that the portion of the ALF occupied by the IR has enough time slots for all the traffic sent between the IR and its anchor to be fed over the links between the same IR and the neighbor IRs it anchors in the APT. In other words, within the length of the ALF requested by the IR, there must exist enough time slots for the flows between an IR and its anchor (which are distributed to the IRs anchored by the IR), and for the flows between the IR and the IRs anchored by the IR (which are fed into the anchor of the IR).

FIG. 4 illustrates one embodiment for a process of determining a number of time slots for a node with its anchor. As shown in the figure, pseudo-code 400 illustrates a procedure called Local_ALF. With the information available at each IR through ATOM packets, the number of time slots needed by an IR with its anchor to ensure flow conservation at the IR is computed according to Procedure Local_ALF. For simplicity, the ASL from an IR to its anchor and the ASL from the anchor to the IR are considered together. Similarly, the ASLs to and from an IR and one of its anchored IRs are considered together. Based on this assumption, the ASL to an anchor and the ASL from the anchor are next to each other in the assignment of ASLs within the ALF. In addition, an ASL reported by an IR in support of anchored IRs is called anchored ASL, and an ASL reported by an IR in support of its own traffic is called self ASL.

Each IR applies Procedure Local_ALF to determine the ASL request to its anchor needed to support the ASLs with its anchored IRs. The total request for time slots from an IR to its anchor equals local_ALF (i.e., the sum of the time slots needed for anchoring IRs and the time slots needed to satisfy the IR's own traffic0. The access point computes the length of the ALF also using Procedure Local_ALF.

When an access point receives an aggregate ASL request from one of its anchored neighbor IRs, it re-computes the APS, i.e., it computes the length of the ALF and determines which time slots should be assigned to which neighbor IRs.

The access point orders its anchored IRs in the ALF according to the ascending order of their identifiers. Hence, the first ASL of the ALF corresponds to the anchored IR with the smallest ID, and the anchored IRs with the largest ID is assigned the last ASL in the ALF. The ALF allocated by the access point includes all ASLs assigned by the access point to its neighbors (supporting the traffic that needs to flow between the access point and the neighboring IRs), and it may also include an additional number of time slots equal to Diff and needed for flow conservation, as computed in Procedure Self_ALF.

To explain the need for flow-conservation time slots, consider the case in which the access point has two anchored IRs with identifiers a and b. In this example, IR a requests 10 slots for its own flows with the access point and 40 slots to support anchored ASLs. On the other hand, IR b requests only 10 slots for its own flows with the access point and 10 time slots to support anchored ASLs. In this case, the total number of time slots needed to support flows between the access point and its anchored IRs equals 70 time slots. However, note that each IR needs time slots to communicate with its anchored IRs feeding traffic to and from the access point through the IR. In the case of IR a, it can communicate with its anchored IRs over channel 2 while IR b communicates with the access point. However, if the ALF is set equal to only 70 slots, there are only 20 time slots available in the ALF for the IRs using IR a as their anchor, because IR a is communicating with the access point during the other 50 slots. Hence, given that IR a can use the 20 time slots in channel 2 during which IR b is communicating with the access point in channel 1, IR a needs an additional 20 slots in channel 2 to satisfy the ASLs with its anchored IRs. This is the number of slots in Diff, computed in Procedure Self_ALF.

After computing the new APS, the access point sends an ATOM packet to its neighbor IRs with the ASLs assigned for the traffic to and from the access point, and an ALF length that may have additional flow-conserving time slots. The time allowed between the assignment of ASLs by the access point and the network time when the new schedule should take place must be sufficiently long for all IRs in the wireless network to obtain at least one ATOM packet informing them of the ASL assignments. Accordingly, the ATOM packet sent by the access point specifies a network time corresponding to at least one epoch after the time when the access point made the assignment of ASLs. The ATOM packet sent by the access point also specifies the new length of the ALF, and a sequence number set to 0.

The same procedure for the allocation of ASLs is followed at each IR. Given that each IR computes its aggregate request for ASLs taking into account the necessary number of flow-conservation time slots required to support traffic with all its anchored IRs, the allocation of ASLs at each IR is very simple and is carried out deterministically. An IR X that is H hops away from the access point is assigned a number of time slots over channel H module 3 equal to its aggregate. Furthermore, IR X knows the ASLs assigned over the same channel to its siblings (i.e., the IRs anchored by its own anchor). In turn, IR X assigns ASLs to its anchored IRs over channel X+1 module 3 using the time slots occupied by its siblings, and only its sibling, in the ALF. All siblings agree on the division of time slots among themselves, because all have the same ASL assignment information from their anchor and know the ASLs used for self-traffic and anchored traffic by one another. Accordingly, they can simply assign ASLs to their anchored IRs following the lexicographic order of their identifiers, skipping the time slots in the local ALF during which each communicates with the anchor of the siblings.

The time slots not used in the local ALF can be used on a contention basis or be reserved by other means as part of the neighborhood channel access mechanism.

Re-Allocation of Bandwidth over the Access Point Tree:

An IR may lose its anchor because of changes in radio connectivity due to mobility or outside interference, or because the anchor fails. In this case, the IR has to obtain a new anchor and have the needed ASLs assigned from that anchor.

Because of the latency involved in obtaining ASLs that require the access point to establish a new schedule, an IR should try to choose as its new anchor an IR that uses the same anchor as the IR's old anchor used to have. This is because the common ancestor in the APT has already allocated the bandwidth for the IR's ASLs as part of its local ALF. Furthermore, the new anchor already knows about the ASLs being used by the IR, and none of its sibling IRs in the APT (i.e., the IRs using the same anchor in the APT) interfere with the ASLs needed by the IR requesting the new anchor.

If an IR x needs a new anchor and its the choice of anchor provided by the network-level routing protocol is an IR y that is not an IR anchored by the same IR as the IR x's old anchor, then IR x can temporarily attach to an IR z as an anchor by sending an ATOM packet that specifies IR z as the present anchor and IR y as the requested anchor. IR z can start forwarding traffic for the ASLs of IR x immediately, while IR y forwards the corresponding ASL request uptree. Both IR y and z know when the ASLs for IR x should start being services by IR y when the new schedule is disseminated over the APT with a new network time.

III.B. Neighborhood Channel Access Mechanism

The only requirement imposed on the neighborhood channel access mechanism by ATOM is that it cannot interfere with ASLs requested or established by ATOM over the three channels allocated to a given access point. Hence, a simple listen-before-transmit etiquette of channel reuse suffices to integrate ATOM with the neighborhood channel access mechanism. In an embodiment of the present invention, an IR listens for a number of frames for ATOM packets, before attempting to send packets according to the neighborhood channel access mechanism.

The above specification, examples, and data provide a complete description of the manufacture and use of the composition of the invention. Since many embodiments of the invention can be made without departing from the spirit and scope of the invention, the invention resides in the claims hereinafter appended.

I claim:

1. A method, comprising:
   sending a scheduling request over an access point tree to an access point, wherein the scheduling request comprises an aggregate of time slot requests associated with at least a node and a next hop node;
   receiving a scheduling decision over the access point tree at the node for the node and the next hop node;
   assigning a first orthogonal data channel to the access point, wherein a first time slot request in the scheduling decision enables communication over the first orthogonal data channel to a node that is one hop away from the access point; and
   assigning a second orthogonal data channel to the node that is one hop away from the access point, wherein a second time slot request in the scheduling decision enables communication over the second orthogonal data channel between the node that is one hop away from the access point and another node that is two hops away from the access point,
   wherein each time slot request in the scheduling decision is reserved for at least the next hop node and the node, and
   wherein the scheduling decision enables the node to communicate a data packet collision-free over orthogonal data channels associated with the next hop node and the node.

2. The method of claim 1, wherein the orthogonal data channels further comprise multiple data channels that are based in part on a modulo three of a minimum hop distance of the node to the access point with data channel reuse.

3. The method of claim 1, wherein the scheduling decision further enables the node to communicate the data packet collision-free over orthogonal data channels between the node and a neighbor node.

4. The method of claim 1, further comprising:
   assigning a third orthogonal data channel to the other node that is two hops away from the access point, wherein a third time slot request in the scheduling decision enables communication over the third orthogonal data channel between the other node that is two hops away from the access point and a third node that is three hops away from the access point.

5. The method of claim 1, further comprising:
   determining the scheduling decision based in part on information associated with a number of hops to the access point along the access point tree that is rooted at the access point.

6. The method of claim 1, wherein the next hop node is identified based in part on at least one of a transmitter assigned local link identifier, and a medium access control address.

7. The method of claim 1, wherein the orthogonal data channels further comprise orthogonal data channels over the access point tree based in part on at least one of a frequency hop sequence, frequency band, data rate, direct-sequence code, and a frequency-hopped spreading code.

8. The method of claim 1, wherein sending the scheduling request further comprises employing a robust environmentally adaptive link medium access control protocol.

9. The method of claim 1, wherein sending the scheduling request and receiving the scheduling decision are based on a robust environmentally adaptive link medium access control, protocol and a two-hop neighborhood associated with the node.

10. The method of claim 1, wherein sending the scheduling request and receiving the scheduling decision further comprises communicating over a common channel in a broadcast mode.

11. The method of claim 1, further comprising:
    assigning the node a time-slot for a collision-free communication of the data packet based in part on a bandwidth demand and communication of the node with at least one neighbor node.

12. The method of claim 1, wherein the network is an ad-hoc network.

13. The method of claim 1, further comprising:
    determining the access point tree based on at least one of a static routing protocol, distance vector routing protocol, link state routing protocol, and a hybrid routing protocol.

14. An apparatus, comprising:
    a transceiver configured to send a scheduling request over an access point tree to an access point and configured to receive a scheduling decision over the access point tree from the access point; and
    a transcoder configured to
        enable the scheduling request to comprise an aggregate of time slot requests associated with at least the apparatus and a next hop node, and
        employ the scheduling decision to determine each time slot request that is reserved for at least the next hop node and the apparatus,
    wherein the scheduling decision enables the apparatus to communicate the data packet collision-free over orthogonal data channels associated with the next hop node and the apparatus,
    wherein the orthogonal data channels comprise a first orthogonal data channel to the access point, wherein a first time slot request in the scheduling decision enables communication over the first orthogonal data channel to a node that is one hop away from the access point, and
    wherein the orthogonal data channels further comprise a second orthogonal data channel to the node that is one hop away from the access point, wherein a second time slot request in the scheduling decision enables communication over the second orthogonal data channel between the node that is one hop away from the access point and another node that is two hops away from the access point.

15. The apparatus of claim 14, wherein the orthogonal data channels further comprise multiple data channels that are based in part on a modulo three of a minimum hop distance of the apparatus to the access point with data channel reuse.

16. The apparatus of claim 14, wherein the scheduling decision further enables the apparatus to communicate the data packet collision-free over orthogonal data channels between the apparatus and a neighbor node.

17. The apparatus of claim 14, wherein the scheduling decision is based in part on information associated with a number of hops to the access point along the access point tree that is rooted at the access point.

18. The apparatus of claim 14, wherein the next hop node is identified based in part on at least one of a transmitter assigned local link identifier, and a medium access control address.

19. The apparatus of claim 14, wherein the orthogonal data channels further comprise orthogonal data channels over the access point tree based in part on at least one of a frequency hop sequence, frequency band, data rate, direct-sequence code, and a frequency-hopped spreading code.

20. The apparatus of claim 14, wherein sending the scheduling request further comprises employing a robust environmentally adaptive link medium access control protocol.

21. The apparatus of claim 14, wherein the transceiver is further configured to send the scheduling request and receive the scheduling decision based on a robust environmentally adaptive link medium access control protocol and a two-hop neighborhood associated with the apparatus.

22. The apparatus of claim 14, wherein the transceiver is further configured to send the scheduling request and receive the scheduling decision over a common channel in a broadcast mode.

23. The apparatus of claim 14, wherein each time slot request is based in part on a bandwidth demand and communication of the node with at least one neighbor node.

24. A system, comprising:
a node that is configured to send a scheduling request over an access point tree to an access point, wherein the scheduling request comprises an aggregate of time slot requests associated with at least the node and a next hop node; and
an access point that is configured to
determine a scheduling decision over the access point tree in response to the aggregated request,
transmit the scheduling decision over the access point tree to the node and the next hop node,
assign a first orthogonal data channel to the access point, wherein a first time slot request in the scheduling decision enables communication over the first orthogonal data channel to a node that is one hop away from the access point, and
assign a second orthogonal data channel to the node that is one hop away from the access point, wherein a second time slot request in the scheduling decision enables communication over the second orthogonal data channel between the node that is one hop away from the access point and another node that is two hops away from the access point.
wherein each time slot request in the scheduling decision is reserved for at least the next hop node and the node, and
wherein the scheduling decision enables the node to communicate the data packet collision-free over orthogonal data channels associated with the next hop node and the node.

25. The system of claim 24, wherein the orthogonal data channels further comprise multiple data channels that are based in part on a modulo three of a minimum hop distance of the node to the access point with data channel reuse.

26. The system of claim 24, wherein the scheduling decision further enables the node to communicate the data packet collision-free over orthogonal data channels between the node and a neighbor node.

27. The system of claim 24, wherein the access point determines the scheduling decision based in part on information associated with a number of hops to the access point along the access point tree that is rooted at the access point.

28. The system of claim 24, wherein the next hop node is identified based in part on at least one of a transmitter assigned local link identifier, and a medium access control address.

29. The system of claim 24, wherein the orthogonal data channels further comprise orthogonal data channels over the access point tree based in part on at least one of a frequency hop sequence, frequency band, data rate, direct-sequence code, and a frequency-hopped spreading code.

30. The system of claim 24, wherein sending the scheduling request further comprises employing a robust environmentally adaptive link medium access control protocol.

31. The system of claim 24, wherein sending the scheduling request is based on a robust environmentally adaptive link medium access control protocol and a two-hop neighborhood associated with the node.

32. A method, comprising:
assigning a node to an access point;
selecting an anchor node for the node, wherein the anchor node is selected as a next hop node along a hop path to the access point;
determining an access point tree based in part on the selected anchor node;
sending a scheduling request over the access point tree to the access point, wherein the scheduling request comprises an aggregate of time slot requests associated with at least the node and the anchor node;
determining a scheduling decision in response to the scheduling request; and
receiving the scheduling decision over the access point tree at the node for the node and the anchor node,
wherein each time slot request in the scheduling decision is reserved for at least the anchor node and the node,
wherein the scheduling decision enables the node to communicate the data packet collision-free over orthogonal data channels associated with the anchor node and the node,
wherein the orthogonal data channels comprise a first orthogonal data channel to the access point, wherein a first time slot request in the scheduling decision enables communication over the first orthogonal data channel to a node that is one hop away from the access point, and
wherein the orthogonal data channels further comprise a second orthogonal data channel to the node that is one hop away from the access point, wherein a second time slot request in the scheduling decision enables communication over the second orthogonal data channel between the node that is one hop away from the access point and another node that is two hops away from the access point.

33. A computer-readable program distribution medium encoding a computer program of instructions being configured to control a processor to perform:
- communicating transmission-scheduling information between nodes in a network; wherein the transmission-scheduling information includes routing information over a spanning tree rooted at an access point; and
- sending a scheduling request over the access point tree to the access point, wherein the scheduling request comprises an aggregate of time slot requests associated with at least a node and a next hop node,
- wherein each time slot request in a scheduling decision is reserved for at least the node and the next hop node,
- wherein the scheduling decision enables the node to communicate a data packet collision-free over orthogonal data channels associated with the node and the next hop node,
- wherein the orthogonal data channels comprise a first orthogonal data channel to the access point, wherein a first time slot request in the scheduling decision enables communication over the first orthogonal data channel to a node that is one hop away from the access point, and
- wherein the orthogonal data channels further comprise a second orthogonal data channel to the node that is one hop away from the access point, wherein a second time slot request in the scheduling decision enables communication over the second orthogonal data channel between the node that is one hop away from the access point and another node that is two hops away from the access point.

34. An apparatus, comprising:
- sending means for sending a scheduling request over an access point tree to an access point, wherein the scheduling request comprises an aggregate of time slot requests associated with at least a node and a next hop node; and
- receiving means for receiving a scheduling decision over the access point tree at the node for the node and the next hop node,
- wherein each time slot request in the scheduling decision is reserved for at least the next hop node and the node, and
- wherein the scheduling decision enables the node to communicate the data packet collision-free over orthogonal data channels associated with the next hop node and the node,
- wherein the orthogonal data channels comprise a first orthogonal data channel to the access point, wherein a first time slot request in the scheduling decision enables communication over the first orthogonal data channel to a node that is one hop away from the access point, and
- wherein the orthogonal data channels further comprise a second orthogonal data channel to the node that is one hop away from the access point, wherein a second time slot request in the scheduling decision enables communication over the second orthogonal data channel between the node that is one hop away from the access point and another node that is two hoes away from the access point.

35. An apparatus, comprising:
- transceiver means for sending a scheduling request over an access point tree to an access point and for receiving a scheduling decision over the access point tree from the access point; and
- transcoder means for
  - enabling the scheduling request to comprise an aggregate of time slot requests associated with at least the apparatus and a next hop node, and
  - employing the scheduling decision to determine each time slot request that is reserved for at least the next hop node and the apparatus,
- wherein the scheduling decision enables the apparatus to communicate the data packet collision-free over orthogonal data channels associated with the next hop node and the apparatus,
- wherein the orthogonal data channels comprise a first orthogonal data channel to the access point, wherein a first time slot request in the scheduling decision enables communication over the first orthogonal data channel to a node that is one hop away from the access point, and
- wherein the orthogonal data channels further comprise a second orthogonal data channel to the node that is one hop away from the access point, wherein a second time slot request in the scheduling decision enables communication over the second orthogonal data channel between the node that is one hop away from the access point and another node that is two hops away from the access point.

* * * * *

UNITED STATES PATENT AND TRADEMARK OFFICE
CERTIFICATE OF CORRECTION

PATENT NO. : 7,580,394 B2　　　　　　　　　　　　　　　　　　　　　　　　Page 1 of 1
APPLICATION NO. : 10/306613
DATED : August 25, 2009
INVENTOR(S) : Jose J. Garcia-Luna-Aceves It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1459 days.

Signed and Sealed this

Fourteenth Day of September, 2010

David J. Kappos
*Director of the United States Patent and Trademark Office*